Figure 2:
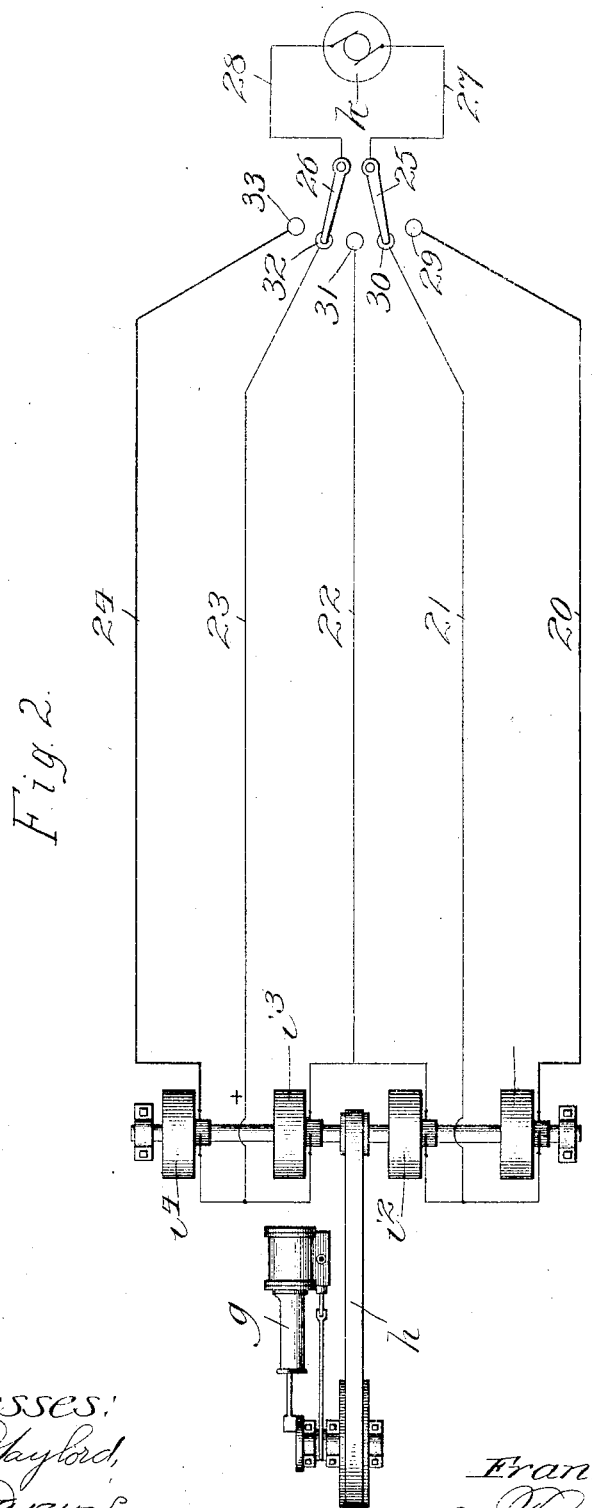

No. 784,523. PATENTED MAR. 7, 1905.
F. HOFFMAN.
SYSTEM OF ELECTRICAL DISTRIBUTION.
APPLICATION FILED AUG. 13, 1903.

2 SHEETS—SHEET 1.

Fig. 1.

Witnesses:
Chas. E. Gaylord.
Geo. E. Lawson.

Inventor:
Frank Hoffman,
By Thomas F. Sheridan,
Atty.

No. 784,523. PATENTED MAR. 7, 1905.
F. HOFFMAN.
SYSTEM OF ELECTRICAL DISTRIBUTION.
APPLICATION FILED AUG. 13, 1903.

2 SHEETS—SHEET 2.

Witnesses:
Chas. E. Gaylord,
Geo. C. Davis.

Inventor,
Frank Hoffman,
By Thomas F. Sheridan,
Atty.

No. 784,523.

Patented March 7, 1905.

UNITED STATES PATENT OFFICE.

FRANK HOFFMAN, OF CHICAGO, ILLINOIS, ASSIGNOR OF ONE-HALF TO ELMER E. HANNA, OF CHICAGO, ILLINOIS.

SYSTEM OF ELECTRICAL DISTRIBUTION.

SPECIFICATION forming part of Letters Patent No. 784,523, dated March 7, 1905.

Original application filed May 21, 1903, Serial No. 158,101. Divided and this application filed August 13, 1903. Serial No. 169,310.

*To all whom it may concern:*

Be it known that I, FRANK HOFFMAN, a citizen of the United States, residing at Chicago, in the county of Cook and State of Illinois, have invented certain new and useful Improvements in Systems of Electrical Distribution, of which the following is a specification, this being a division of an application filed by me May 21, 1903, Serial No. 158,101.

This invention relates to a system of electrical distribution having for its principal object the providing of a simple, economical, and efficient system of electrical distribution by which an electric motor or motors may be supplied with current so as to obtain substantially uniform speed or change of speed to meet different circumstances and conditions, as will more fully hereinafter appear.

The invention consists in a system of electrical distribution in which there are combined a plurality of generators of equal electric force and capacity, a plurality of electric conductors forming three or more electric circuits of equal potential and connecting the opposite poles of said generators in series, an electric motor, and switch mechanism connecting the electric motor with different pairs of the conductors.

The invention consists, further and finally, in the features, combinations, and details of construction hereinafter described and claimed.

In the accompanying drawings, Figure 1 is a diagram of a system embodying one form of my improvements; and Fig. 2, a diagram embodying a modification thereof, as will more fully hereinafter appear.

In the art to which this invention relates it is well known that it is very desirable to so arrange the wiring and distribution of the electric energy that each circuit or pair of wires and the generator furnishing the current thereto should have as nearly as possible a constant load and each circuit a load equal with the others or be in balance, so that the motors may be run at uniform speeds or at different speeds without destroying the balance of the system.

Describing the system illustrated in Fig. 1, $a$ is a main generator of the desired electromotive force and capacity of developing, for instance, two hundred and twenty volts and is connected with four motor-generators $b$, $b'$, $b^2$, and $b^3$ by means of the main lead-wires 1 and 2. These "supplementary" or "motor" generators, as I prefer to term them, are connected across the main leads in the series and have their opposite poles connected in series with a plurality of conductors 3, 4, and 5 and the main conductors 1 and 2, above described, so as to form three or more circuits of equal potential. These motor-generators are of such construction that they develop when running at speed an electromotive force of fifty-five volts each, so that it will be seen that the circuit formed between any pair of adjacent conductors has a potential of fifty-five volts, while between any other pair there would be a multiple thereof—say, for instance, between 1 and 4 there would be a circuit having a potential of one hundred and ten volts, between 1 and 5 a circuit having a potential of one hundred and sixty-five volts, and between 1 and 2 a circuit having the maximum potential of two hundred and twenty volts. In this figure I have shown three electric motors $c$, $d$, and $e$, all connected between the above-named conductors, so that the desired speeds may be obtained. One armature-terminal of the electric motor $c$ is connected with the main lead 2 by means of the wire 6 and its opposite terminal by means of wire 7, and switch-lever 8 may be connected with any of the contact-points 9, 10, 11, or 12 of the other wires. In the drawings it is connected with the contact-point 12 of wire 5 and is therefore in a circuit formed by wires 2 and 5, having a potential of fifty-five volts. One armature-terminal of the electric motor $d$ is connected with the main lead 1 by means of wire 14 and its opposite terminal by means of the wire 15, and the switch-lever 16 is connected with the contact-point 11 of wire 4, so that such motor is in the circuit formed by wires 1 and 4 and has a potential of twice fifty-five volts—viz., one hundred and ten volts. The armature-terminals of the electric motor $e$ are, by means of wires 17 and 18, connected with the main wires 1 and 2 and are embraced in the circuit having the maximum potential on the multiple of four circuits—viz., two hundred and twenty volts.

From the above description and an examination of Fig. 1 it will be seen that either of the electric motors $c$ and $d$ can be placed in a circuit having a potential of fifty-five volts or the multiple thereof—such as one hundred and ten, one hundred and sixty-five, or two hundred and twenty volts—whenever occasion requires and that the system will not be thrown out of balance by any of these changes. In other words, both motors cannot come at one time on wires 1 and 3, 4 or 5, nor on 2 and 5, 4 or 3, and any number of motors can be arranged in the same way also. The lowest voltage may be taken between the wires 3 and 4, 4 and 5, and the other voltages—say one hundred and ten—between wires 3 and 5, as well as between 1 and 4 or 2 and 4, thus enabling all the generators and wires to be of one size and capacity and much smaller than where the lowest voltage can come from one generator and on two wires only.

In Fig. 2 I have illustrated the prime mover as a steam-engine $g$ instead of an electric generator, as shown in Fig. 1. This steam-engine by means of a belt $h$ drives an armature-shaft $i$, carrying four electric generators $i'$, $i^2$, $i^3$, and $i^4$, the opposite poles of which are connected in series with a plurality of conductors 20, 21, 22, 23, and 24, so as to form four electric circuits of equal potential. These electric generators are of the same electromotive force and capacity, say about fifty-five volts, so that each independent circuit has a potential of fifty-five volts; but when wires of different pairs are connected across in any desired manner a circuit of different potential than any of the generators, but a multiple thereof, may be obtained—in other words, a circuit of the potential of all the generators combined or of two or more. An electric motor $k$ is provided, the armature-terminals of which are connected with switch-levers 25 and 26 by means of wires 27 and 28, respectively. These switch-levers are so arranged that the motor $k$ may be thrown into a circuit formed by any two pairs of the conductors. As shown in the drawings, it is electrically connected with the conductors 21 and 23, so as to form a circuit having the potential of two circuits with a total potential of one hundred and ten volts. A switch-lever, however, may be thrown into electric connection with any of the contact-points 29, 30, 31, 32, and 33 and obtain any potential force which is the multiple of fifty-five. For instance, the switch-lever 25 may be moved over so as to contact the point 29, and thereby embrace a circuit formed by the pairs of wires 20 and 23, having a potential three times fifty-five volts—namely, one hundred and sixty-five volts.

From the foregoing description of construction and operation it will be seen that any one of the motors in either figures, with the exception of the motor $e$, may be switched from any single pair to any other pair of conductors for obtaining the uniform speed, or it may be connected with any other given pair to obtain a change of speed, or embraced in the electric circuit, which has a potential equal to the sum of the potential of the several circuits.

The principal advantages resulting from the use of my improvements is, as above stated, the possibility of using when operating a plurality of motors the minimum potential, maximum potential, or any intermediate potential without disturbing the balance of the system.

I claim—

1. In a system of electric distribution, the combination of a plurality of electric conductors forming three or more electric circuits of equal potential, an electric motor, and switch mechanism for connecting the electric motor between different pairs of the conductors, substantially as described.

2. In a system of electric distribution, the combination of a plurality of generators of equal electromotive force and capacity, a plurality of electric conductors forming three or more electric circuits of equal potential, said generators having their opposite poles connected in series with said conductors, an electric motor, and switch mechanism connecting the electric motor between different pairs of conductors, substantially as described.

FRANK HOFFMAN.

Witnesses:
WILLIAM H. LEWIS,
CLARENCE R. CROW.